G. MATSUSHITA.
DIRECTION INDICATING DEVICE.
APPLICATION FILED AUG. 30, 1920.
1,404,991. Patented Jan. 31, 1922.
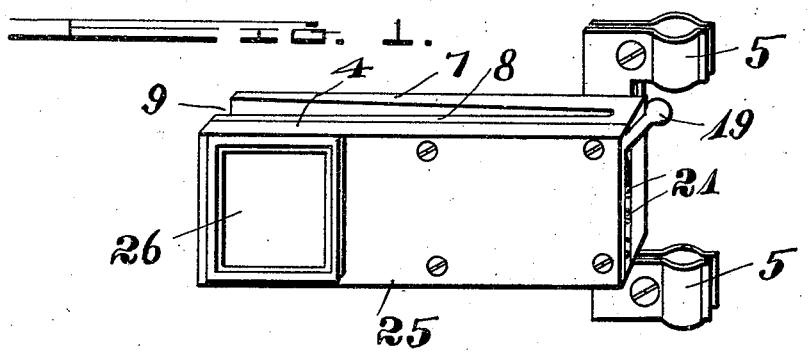
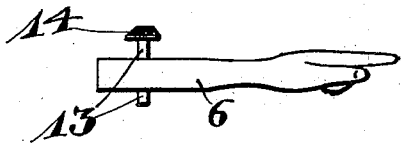
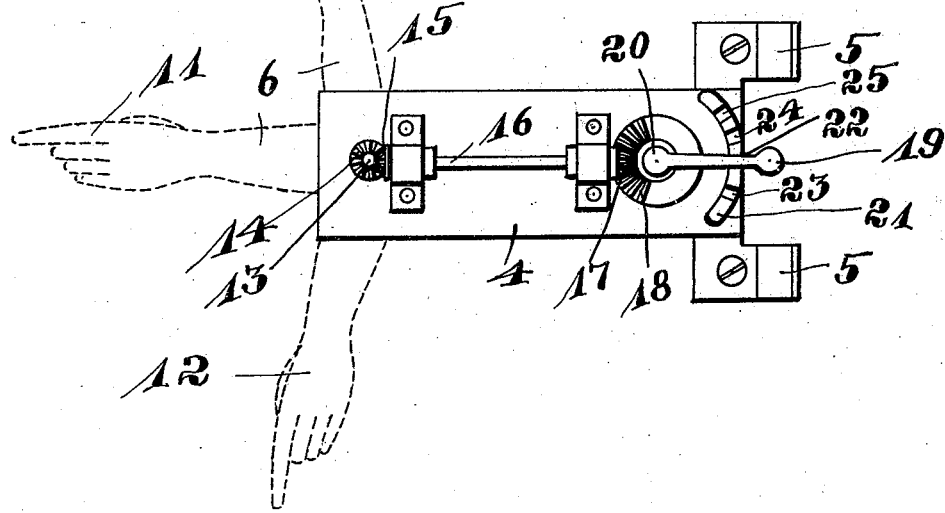
INVENTOR:
Sentaro Matsushita,
By: Edward M. Kojima
ATTORNEY.

UNITED STATES PATENT OFFICE.

GENTARO MATSUSHITA, OF SELMA, CALIFORNIA.

DIRECTION-INDICATING DEVICE.

1,404,991. Specification of Letters Patent. Patented Jan. 31, 1922.

Application filed August 30, 1920. Serial No. 406,985.

*To all whom it may concern:*

Be it known that I, GENTARO MATSUSHITA, a subject of the Emperor of Japan, residing at Selma, in the county of Fresno and State of California, have invented a new and useful Direction-Indicating Device, of which the following is a specification.

This device, forming the base of the present invention, has relation to devices used on vehicles for indicating to other vehicles and generally the operation of such vehicle, and also helping the driver of such vehicle to properly operate the vehicle without colliding with other vehicles.

One of the objects of this invention is to make a device of this type ornamental as well as practical.

Another object is to provide a device of such appearance that it cannot be taken for a signal when in inoperative position, having the signaling parts so designed as to entirely disappear within the body portion of the device in such inoperative position.

Another object is to provide indicating members so designed as to conform in appearance and principle with the signals given by drivers of vehicles.

Other objects will appear from the following description and appended claim as well as from the accompanying drawing, in which—

Fig. 1 is a perspective view of the device, in which the operating parts are in inoperative position within the body or housing of the device.

Fig. 2 is a front elevation of the device with the cover plate removed, illustrating the principal operating parts of the device in their relative position.

Fig. 3 is a side elevation of the indicating member in detail.

Similar numbers refer to similar parts throughout the several views.

The main body or housing 4 is provided with clamping members 5 by which the device can be attached to suitable places of vehicles, preferably the windshield of automobiles.

The swinging arm 6 is disposed between the two main plates 7 and 8 of the body portion of the device, so that it can be moved to disappear within the slit 9, see Fig. 1, or appear in the several positions for indicating directions or movements to be taken by such vehicle, as illustrated in Fig. 2. The hand up, as indicated at 10, normally indicates that the vehicle is going to take a turn towards the right. The hand moved to the position as indicated at 11 normally indicates that the vehicle is going to take a turn towards the left. The hand moved to the position as indicated at 12 normally indicates that the vehicle is going to take a turn or is about to slow down to such an extent that others should be warned to prevent a collision between different vehicles. The swinging arm is provided with a shaft 13, forming the point around which the arm swings. A bevel gear 14 is provided at the end of the shaft 13 to come into engagement with another bevel gear 15 on the shaft 16. The bevel gear 17 is provided on the opposite end of the shaft 16 engaging with the bevel gear 18. An operating arm or lever 19 is operatively in engagement with the bevel gear 18 so that, by an operation of the lever 19, the several gears and shafts can be operated. A notched bar 21 is provided to hold the operating lever 19 in position when so operated or set, the several notches 22, 23, 24 and 25 corresponding with the several positions in which the swinging arm is to appear or is desired.

The operating arm or lever 19 is preferably made of suitable material to allow a springing effect to engage the lever 19 in the several notches, and allowing a disengaging from such notches by simply bending the lever enough to come out of the notches when so desired.

The rear plate 25 is preferably designed so as to clearly have no appearance of any indicating lever pointing towards a certain direction from a vehicle when attached. For this reason, I prefer to have a mirror 26 mounted on this rear plate, so as to give the whole device the appearance of a mirror carrier in its normal inoperative position.

The lever 19 is illustrated in Fig. 2 in its neutral or inoperative position engaged in the notch 22 of the bar 21.

The rear plate 25 with the mirror face is removed from the device as illustrated in Fig. 2, leaving the mechanism open to view.

The swinging arm is in such inoperative or neutral position within the slit of the device, see Fig. 1, behind the operating mechanism as illustrated in Fig. 2.

Moving the operating lever 19 to the notch 23 causes a turning of the bevel gears 14, 15, 17 and 18, and thereby a swinging of the arm to the position indicated at 10, as will easily be understood.

Moving the operating lever 19 to the notch 24 causes a turning of the bevel gears 14, 15, 17 and 18, and thereby a swinging of the indicating arm to the position indicated at 12.

Moving the operating lever 19 to the notch 25 causes a turning of the several gears and shafts, and thereby a swinging of the indicating arm to the position indicated at 11.

The movement of the operating lever 19 is naturally entirely controlled by the sizes of the gears, an enlarging of the gear 18, for instance, without enlarging the gear 17 naturally allows a very short movement of the operating lever 19 in relation to the larger movement of the swinging indicating arm, as will easily be understood. Proportioning such gears properly, makes for an easy and quick operating of the device.

Having thus described my invention, I claim:

In a direction indicating device, a housing having means for securing the device to a vehicle and having a split portion projecting away from the securing means forming an open end, a swinging indicating arm having a shaft near its base end so that the indicating portion of the arm may swing around such shaft, a gear provided on the shaft, the shaft of the arm disposed crosswise through the housing and through the split portion of the housing near the open end of the housing, an operating arm disposed in the housing having a portion projecting out of the housing near the securing end of the housing, a gear on the base of the operating arm, an intermediate shaft having a gear on each end for operatively engaging the gear on the operating arm with the gear on the indicating arm, and a notched bar disposed near the operating arm for holding the arms in certain indicating positions.

In testimony that I claim the foregoing as my invention I have signed my name in the presence of two subscribing witnesses.

GENTARO MATSUSHITA.

Witnesses:
HENRY S. HUKASAWA,
SETSU UCHIDA.